US012633297B2

(12) United States Patent
Bondi et al.

(10) Patent No.: US 12,633,297 B2
(45) Date of Patent: May 19, 2026

(54) SYSTEMS AND METHODS OF PROCESSING AUDIO DATA WITH A MULTI-RATE LEARNABLE AUDIO FRONTEND

(71) Applicant: Robert Bosch GmbH, Stuttgart (DE)

(72) Inventors: Luca Bondi, Pittsburgh, PA (US); Irtsam Ghazi, Pittsburgh, PA (US); Charles Shelton, Monroeville, PA (US); Samarjit Das, Wexford, PA (US)

(73) Assignee: Robert Bosch GmbH (DE)

( * ) Notice: Subject to any disclaimer, the term of this patent is extended or adjusted under 35 U.S.C. 154(b) by 338 days.

(21) Appl. No.: 18/368,171

(22) Filed: Sep. 14, 2023

(65) Prior Publication Data

US 2025/0095664 A1 Mar. 20, 2025

(51) Int. Cl.
*G10L 19/02* (2013.01)

(52) U.S. Cl.
CPC ................................ *G10L 19/0204* (2013.01)

(58) Field of Classification Search
CPC ................................................... G10L 19/0204
See application file for complete search history.

(56) References Cited

U.S. PATENT DOCUMENTS

| | | | | |
|---|---|---|---|---|
| 9,893,694 | B2 * | 2/2018 | Edler | G10L 19/0204 |
| 2024/0265928 | A1 * | 8/2024 | Wang | G10L 25/30 |
| 2025/0087223 | A1 * | 3/2025 | Pia | G10L 19/032 |
| 2025/0174237 | A1 * | 5/2025 | Ragot | G10L 25/30 |

OTHER PUBLICATIONS

X. Zhang, Y. Zou, and W. Wang, "LD-CNN: A Lightweight Dilated Convolutional Neural Network for Environmental Sound Classification," in 2018 24th International Conference on Pattern Recognition (ICPR), 2018, pp. 373-378.

F. Frederic, M. Annamaria, E. Daniel P.W., F. Eduardo, F. Magdalena, and E. Benjamin, Proceedings of the 6th Workshop on Detection and Classification of Acoustic Scenes and Events (DCASE 2021). Barcelona, Spain: DCASE, Nov. 2021.

A. Guzhov, F. Raue, J. Hees, and A. Dengel, "ESResNet: Environmental Sound Classification Based on Visual Domain Models," in 2020 25th International Conference on Pattern Recognition (ICPR), 2021, pp. 4933-4940.

(Continued)

*Primary Examiner* — Fan S Tsang
*Assistant Examiner* — Tyler Michael Liebgott
(74) *Attorney, Agent, or Firm* — Dickinson Wright PLLC

(57) ABSTRACT

Methods and systems of processing audio data with a multi-stage audio front end model is provided. A one-dimensional audio waveform is received as input and processed using a multi-stage audio frontend model to convert the one-dimensional waveform into a two-dimensional matrix representing features of the audio waveform. The multi-stage learnable audio frontend model is configured to apply a first filterbank to the audio waveform to generate a first time-frequency representation of the audio waveform; apply a first decimation filter to the audio waveform to generate a first decimated audio input; apply a second filterbank to the first decimated audio input to generate a second time-frequency representation of the audio waveform; and stack the first time-frequency representation and the second time-frequency representation together to generate the two-dimensional matrix.

20 Claims, 8 Drawing Sheets

(56) References Cited

OTHER PUBLICATIONS

R. Tanabe, H. Purohit, K. Dohi, T. Endo, Y. Nikaido, T. Nakamura, and Y. Kawaguchi, "MIMII DUE: Sound Dataset for Malfunctioning Industrial Machine Investigation and Inspection with Domain Shifts due to Changes in Operational and Environmental Conditions," arXiv:2105.02702 [cs, eess, stat], Sep. 2021, arXiv: 2105.02702.

N. Harada, D. Niizumi, D. Takeuchi, Y. Ohishi, M. Yasuda, and S. Saito, "ToyADMOS2: Another dataset of miniature-machine operating sounds for anomalous sound detection under domain shift conditions," arXiv:2106.02369 [eess], Jun. 2021, arXiv: 2106.02369.

Y. Koizumi, S. Saito, M. Yamaguchi, S. Murata, and N. Harada, "Batch Uniformization for Minimizing Maximum Anomaly Score of Dnn-Based Anomaly Detection in Sounds," in 2019 IEEE Workshop on Applications of Signal Processing to Audio and Acoustics (WASPAA), 2019, pp. 6-10.

T. Hayashi, S. Watanabe, T. Toda, T. Hori, J. Le Roux, and K. Takeda, "Blstm-hmm hybrid system combined with sound activity detection network for polyphonic sound event detection," in 2017 IEEE International Conference on Acoustics, Speech and Signal Processing (ICASSP), 2017, pp. 766-770.

K. Imoto, N. Tonami, Y. Koizumi, M. Yasuda, R. Yamanishi, and Y. Yamashita, "Sound event detection by multitask learning of sound events and scenes with soft scene labels," in ICASSP 2020—2020 IEEE International Conference on Acoustics, Speech and Signal Processing (ICASSP), 2020, pp. 621-625.

H. Zhao, C. Gan, A. Rouditchenko, C. Vondrick, J. McDermott, and A. Torralba, "The Sound of Pixels," Lecture Notes in Computer Science (including subseries Lecture Notes in Artificial Intelligence and Lecture Notes in Bioinformatics), vol. 11205 LNCS, pp. 587-604, 2018, arXiv: 1804.03160 ISBN: 9783030012458.

A. Owens, J. Wu, J. H. McDermott, W. T. Freeman, and A. Torralba, "Learning Sight from Sound: Ambient Sound Provides Supervision for Visual Learning," International Journal of Computer Vision, vol. 126, No. 10, pp. 1120-1137, Dec. 2017, arXiv: 1712.07271. [Online]. Available: http://arxiv.org/abs/1712.07271.

R. Arandjelovic and A. Zisserman, "Look, Listen and Learn," in 2017 IEEE International Conference on Computer Vision (ICCV). IEEE, Oct. 2017, pp. 609-617, arXiv: 1705.08168. [Online]. Available: https://arxiv.org/abs/1705.08168.

M. Nagel, M. Fournarakis, R. A. Amjad, Y. Bondarenko, M. van Baalen, and T. Blankevoort, "A white paper on neural hetwork quantization," ArXiv, vol. abs/2106.08295, 2021.

S. Hershey, S. Chaudhuri, D. P. W. Ellis, J. F. Gemmeke, A. Jansen, R. C. Moore, M. Plakal, D. Platt, R. A. Saurous, B. Seybold, M. Slaney, R. J. Weiss, and K. Wilson, "CNN architectures for large-scale audio classification," in 2017 EEE International Conference on Acoustics, Speech and Signal Processing (ICASSP), 2017, pp. 131-135.

N. Zeghidour, O. Teboul, F. de Chaumont Quitry, and M. Tagliasacchi, "Leaf: A learnable frontend for audio classification," ICLR, 2021.

M. Ravanelli and Y. Bengio, "Speaker Recognition from Raw Waveform with SincNet," 2018 IEEE Spoken Language Technology Workshop, SLT 2018—Proceedings, pp. 1021-1028, 2019, arXiv: 1808.00158 ISBN: 9781538643341.

B. Jacob, S. Kligys, B. Chen, M. Zhu, M. Tang, A. Howard, H. Adam, and D. Kalenichenko, "Quantization and Training of Neural Networks for Efficient Integer-Arithmetic-Only Inference," in 2018 IEEE/CVF Conference on Computer Vision and Pattern Recognition. Salt Lake City, UT: IEEE, Jun. 2018, pp. 2704-2713. [Online]. Available: https://ieeexplore.ieee.org/document/8578384/.

D. D. Lin, S. S. Talathi, and V. S. Annapureddy, "Fixed Point Quantization of Deep Convolutional Networks," in Proceedings of the 33rd International Conference on International Conference on Machine Learning—vol. 48, ser. ICML'16. JMLR.org, 2016, pp. 2849-2858, eventplace: New York, NY, USA.

E. Meller, A. Finkelstein, U. Almog, and M. Grobman, "Same, Same But Different—Recovering Neural Network Quantization Error Through Weight Factorization," arXiv:1902.01917 [cs, stat], Feb. 2019, arXiv: 1902.01917. [Online]. Available: http://arxiv.org/abs/1902.01917.

M. Tan and Q. V. Le, "EfficientNet: Rethinking model scaling for convolutional neural networks," 36th International Conference on Machine Learning, ICML 2019, vol. 2019-June, p. 10 691-10 700, 2019, arXiv: 1905.11946 Publisher: PMLR ISBN: 9781510886988.

H. Zhao, C. Gan, W. Ma, and A. Torralba, "The Sound of Motions," in 2019 IEEE/CVF International Conference on Computer Vision (ICCV). Los Alamitos, CA, USA: IEEE Computer Society, Nov. 2019, pp. 1735-1744. [Online]. Available: https://doi.ieeecomputersociety.org/10.1109/ICCV.2019.00182.

N. Zeghidour, N. Usunier, I. Kokkinos, T. Schaiz, G. Synnaeve, and E. Dupoux, "Learning Filterbanks from Raw Speech for Phone Recognition," in 2018 IEEE International Conference on Acoustics, Speech and Signal Processing (ICASSP), 2018, pp. 5509-5513.

K. Yang, B. Russell, and J. Salamon, "Telling Left from Right: Learning Spatial Correspondence of Sight and Sound," Proceedings of the IEEE Computer Society Conference on Computer Vision and Pattern Recognition, pp. 9929-9938, Jun. 2020, arXiv: 2006.06175. [Online]. Available: http://arxiv.org/abs/2006.06175.

J. Cramer, H.-H. Wu, J. Salamon, and J. P. Bello, "Look, Listen, and Learn More: Design Choices for Deep Audio Embeddings," in ICASSP 2019—2019 IEEE International Conference on Acoustics, Speech and Signal Processing (ICASSP). Brighton, United Kingdom: IEEE, May 2019, pp. 3852-3856. [Online]. Available: https://ieeexplore.ieee.org/document/8682475/.

P. P. Kingma and J. Ba, "Adam: A Method for Stochastic Optimization," arXiv:1412.6980 [cs], Jan. 2017, arXiv: 1412.6980. [Online]. Available: http://arxiv.org/abs/1412.6980.

P. Warden, "Speech Commands: A Dataset for Limited-Vocabulary Speech Recognition," ArXiv e-prints, Apr. 2018. [Online]. Available: https://arxiv.org/abs/1804.03209.

B. Vlasenko, B. Schuller, A. Wendemuth, and G. Rigoll, "Combining frame and turn-level information for robust recognition of emotions within speech," Proceedings of Interspeech, pp. 2249-2252, Jan. 2007.

Website for Tensorflow, "TensorFlow Datasets, a collection of ready-to-use datasets," https://www.tensorflow.org/datasets, retrieved on Sep. 14, 2023, 1 page.

H. Zhang, M. Cisse, Y. N. Dauphin, and D. Lopez-Paz, "mixup: Beyond empirical risk minimization," 2018.

H. Cao, D. G. Cooper, M. K. Keutmann, R. C. Gur, A. Nenkova, and R. Verma, "CREMA-D: Crowd-sourced emotional multimodal actors dataset," IEEE transactions on affective computing, vol. 5, No. 4, pp. 377-390, 2014.

D. S. Park, W. Chan, Y. Zhang, C.-C. Chiu, B. Zoph, E. D. Cubuk, and Q. V. Le, "SpecAugment: A Simple Data Augmentation Method for Automatic Speech Recognition," in Interspeech 2019. ISCA: ISCA, Sep. 2019, pp. 2613-2617, arXiv: 1904.08779. [Online]. Available: https://arxiv.org/abs/1904.08779.

* cited by examiner

Algorithm 1 Multi-Rate Filterbank Construction

Require: K, F, $f_s^{(0)}$, $\sigma_{min}$ function GETMULTISTAGEFB $l \leftarrow 0$ $F_{in}^{(0)} \leftarrow F$ While $|F_{in}^{(l)}| > 0$ do $I \leftarrow$ GETSTAGEIDXS($f_s^{(l)}$)

$F^{(l)} \leftarrow \{ f_i \in F_{in}^{(l)}, i \in I \}$ $F_{in}^{(l+1)} \leftarrow \{ f_i \in F_{in}^{(l)}, i \notin I \}$ if $|F_{in}^{(l+1)}| = 0$ then break end if $r^{(l)} \leftarrow$ GETDECIMATIONRATE($F_{in}^{(l+1)}$, $f_s^{(i)}$)

$(f_s^{(l+1)}, f_s^{(l)}/r$ $l \leftarrow l + 1$ end while $L \leftarrow l$ ▹ Final number of stages return $\{ (F^{(j)}, r^{(j)}) \}$ □$_j \in [0, L-1]$ end function function GETSTAGEIDXS($F_{in}$, $f_s$)

$I \leftarrow \{\}$ for $i \in [1, |F_{in}|]$ do $\omega \leftarrow f_i / f_s$ $\sigma \leftarrow b_i / f_s$

FIG. 4

```
if (π/K ≤ ω < π) Λ (σ > σ_min) then
I ← I U {i}
end if
end for
return I
end function

function GETDECIMATIONRATE(F_in, f_s)
r^(c) ← [f_s/(2max{f_i ϵ F_in})]
r ← r^(c)
c_max ← 0
while r^(c) > 1 do
f_s^(c) ← f_s/r^(c)
c ← |GETSTAGEIDXS(F_in, f_s^(c))|
if c > c_max then
r ← r^(c)
c_max ← c
end if
r^(c) ← r^(c) - 1
end while
return r
end function
```

FIG. 4 (Continued)

SYSTEMS AND METHODS OF PROCESSING AUDIO DATA WITH A MULTI-RATE LEARNABLE AUDIO FRONTEND

TECHNICAL FIELD

The present disclosure relates to systems and methods of processing audio data with a multi-rate learnable audio frontend.

BACKGROUND

Following the success of convolutional neural networks (CNN) in computer vision, recent years have seen many a growing adoption of audio-based CNNs on a variety of tasks. Pioneer research in automatic speech recognition paved the way for the adoption of deep neural networks (DNN) on a variety of audio tasks. Sound event detection and environmental sound classification with and without visual cues are dominating the landscape of recent scientific publications, also thanks to the broad success of DCASE challenges. Recently released datasets on industrial machine fault detection and monitoring via audio recordings are driving a new wave of audio DNN architectures tailored for industrial use-cases.

Audio DNN architectures are typically structured as a sequence of three components: a frontend, an encoder, and a head. Raw audio samples are fed to the frontend to generate a time-frequency representation, transformed into an embedding by the encoder, and finally fed to the head to produce the desired output.

SUMMARY

According to one embodiment, method of processing audio data with a multi-stage audio front end model is provided. The method includes receiving, as input, a one-dimensional audio waveform. The method includes processing the audio waveform using a multi-stage audio front end model to convert the one-dimensional the waveform into a two-dimensional matrix representing features of the audio waveform, wherein the multi-stage learnable the model is configured to perform the following: Apply a first filterbank to the audio waveform to generate a first time-frequency representation of the audio waveform; apply a first decimation filter to the audio waveform to generate a first decimated audio input; apply a second filterbank to the first decimated audio input to generate a second time-frequency representation of the audio waveform; and stack the first time-frequency representation and the second time-frequency representation together to generate the two-dimensional matrix. The method also includes processing the two-dimensional using an audio understanding machine learning model having a plurality of audio understanding parameters to generate a respective output for each of one or more audio understanding tasks.

In another embodiment, an audio processing system includes a processor, and memory having instructions. When executed by the processor, the memory causes the processor to perform the following: receive a one-dimensional audio waveform; process the one-dimensional waveform via a multi-stage learnable audio frontend model to convert the one-dimensional audio waveform into a two-dimensional matrix representing features of the audio waveform; and process the two-dimensional matrix using an audio understanding machine learning model having a plurality of audio understanding parameters to generate a respective output for each of one or more audio understanding tasks. The multi-stage learnable audio frontend model is configured to: apply a first filterbank to the audio waveform to generate a first time-frequency representation of the audio waveform; apply a first decimation filter to the audio waveform to generate a first decimated audio input; apply a second filterbank to the first decimated audio input to generate a second time-frequency representation of the audio waveform; and stack the first time-frequency representation and the second time-frequency representation together to generate the two-dimensional matrix.

BRIEF DESCRIPTION OF THE DRAWINGS

FIG. 4 illustrates an algorithm executed by a processor for applying the multi-stage learnable audio frontend model, specifically how to allocate the desired initialization frequencies and related bandwidths to the different stages of the multi-rate learnable audio frontend, and how to compute the decimation rate for each stage, according to an embodiment.

DETAILED DESCRIPTION

Figure 1:
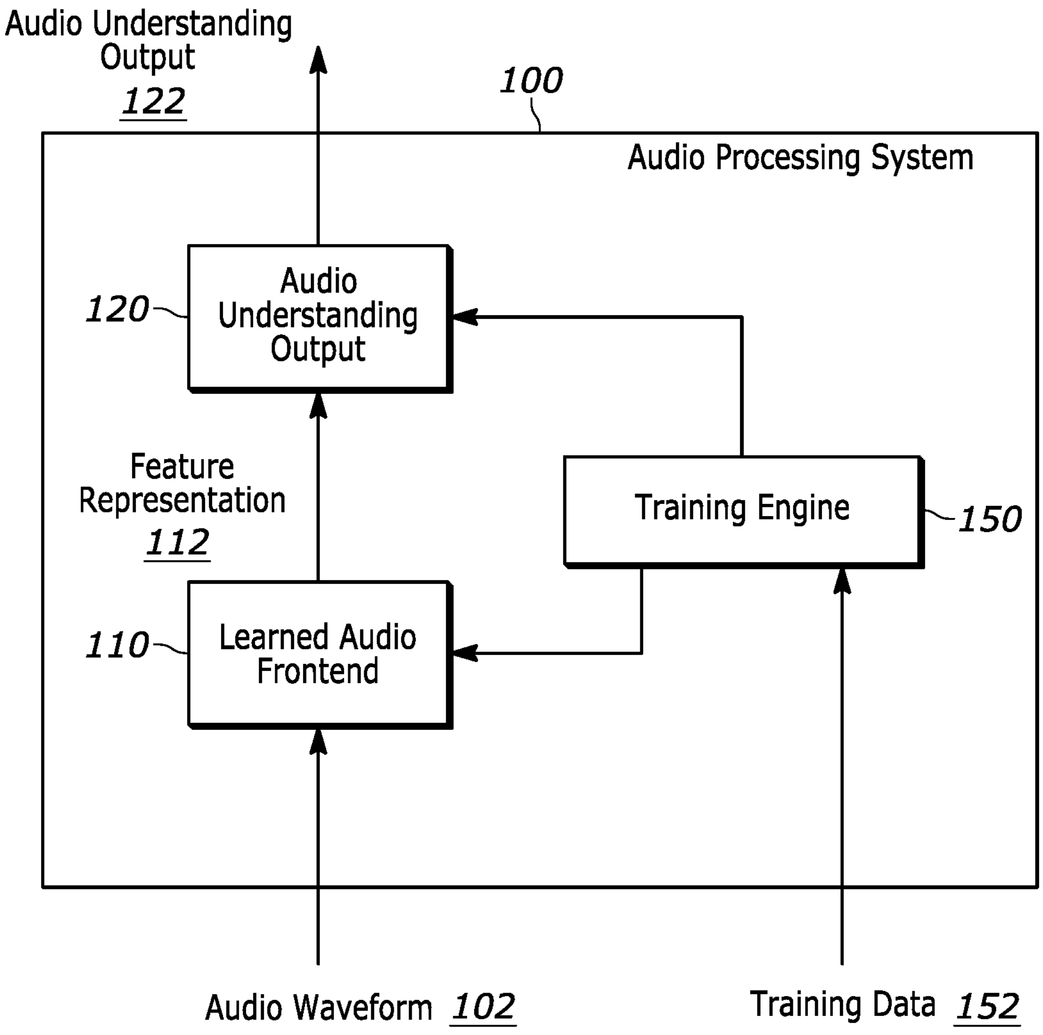
FIG. 1 illustrates a schematic example of an audio processing system, according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative bases for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical application. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

The present disclosure makes references to one-dimensional (1D) and two-dimensional (2D) representation of sound. While the representation of an audio waveform involves two axes (time and amplitude), it can be referred to as a 1D signal due to the way it's typically processed and analyzed. This is because each point on the waveform corresponds to a specific moment in time, and the value at that point represents the amplitude of the sound at that moment. When audio data is stored or manipulated in digital form, it can be arranged as a single sequence of values (amplitudes) over time, which is why it can be referred to as one-dimensional.

Following the success of convolutional neural networks (CNN) in computer vision, recent years have seen many a growing adoption of audio-based CNNs on a variety of tasks. Pioneer research in automatic speech recognition paved the way for the adoption of deep neural networks (DNN) on a variety of audio tasks. Sound event detection and environmental sound classification with and without visual cues are dominating the landscape of recent scientific publications, also thanks to the broad success of DCASE challenges. Recently released datasets on industrial machine fault detection and monitoring via audio recordings are driving a new wave of audio DNN architectures tailored for industrial use-cases. Audio-based anomaly detection with convolutional neural networks or auto-regressive models are just examples of how audio CNNs are getting close to the needs of the industry.

While researchers are exploring the benefits of selfsupervised, multi-modal learning on audio-visual datasets input signals for audio and images remain fundamentally different. Within a few hundred pixels of distance, an image contains all the information needed for object or face recognition. This doesn't immediately hold for raw audio signals, long sequences of thousands of samples where important clues on the content are generally spread across the whole sequence. To overcome this difference, and quickly adopt vision-based architectures in audio use cases, a time-frequency representation of the audio signal is typically computed at first with some filterbank. While most of the layers adopted for audio DNN architectures are thus grounded in vision, with small-sized 2D convolutions, pooling, and normalization layers being widely used, recent developments in speaker recognition and sound classification show how a learnable filterbank, i.e. a 1D convolutional layer with a kernel size in the order of hundreds of samples, could be highly beneficial.

Grounded in these latest works, the present disclosure turns to the deployment of audio-based CNNs with learnable frontends on vector processors and hardware accelerators. As current literature is mainly focusing on the optimization of quantization strategies for vision models, large 1D convolutional kernels required by learnable filterbanks are not immediately deployable on current platforms. While most toolchains for embedded DNN conversion and deployment are working well for 2D convolutional filters up to 11×11, the adoption of large 1D kernels with 300 or more coefficients is either not supported, or subject to large loss in accuracy. This disclosure proposes a design methodology for a multi-rate learnable filterbank for audio-based DNNs subject to kernelsize constraints derived from the hardware platform of choice, that opens the way for modern, learnable audio frontends to be effectively implemented on existing hardware accelerators.

Audio DNN architectures are typically structured as a sequence of three components: a frontend, an encoder, and a head. Raw audio samples are fed to the frontend to generate a time-frequency representation, transformed into an embedding by the encoder, and finally fed to the head to produce the desired output. The first wave of deep audio architectures was based on fixed, non-learnable, frontends, typically a log-Mel spectrogram. Recent works have shown how learnable frontends can boost accuracy and are better suited to a wider variety of tasks. The first stage of learnable frontends is a 1D convolutional filterbank whose coefficients are learned via back-propagation. When it comes to the deployment of audio DNNs on embedded platforms, the frontend can be either implemented with custom code to run on the CPU, or it can be integrated as a sequence of one or more network layers, to run on a dedicated vector processor, e.g., a neural engine. While the discussion of pros and cons of the two options is outside the scope of this disclosure, this disclosure mainly focuses on the latter approach. The rationale is in order to streamline the development and integration of updated DNN models with a learnable frontend, it is often desirable to feed the vector processor with raw audio samples from a microphone, and then let the frontend, the encoder, and the head be computed on the neural engine.

When it comes to the design of a 1D convolutional filterbank, in an embodiment, a main hyperparameter to set is the kernel size K. Given a sampling rate $f_s$, the lowest frequency component that can be represented by a filter of length K is $f_s/K$, thus K is typically chosen large enough to accommodate for the lowest frequency of interest to be represented. In practical terms, with a sampling rate of 16 kHz and a lowest frequency of 40 Hz to be represented, K would be greater than 400.

A drawback of running audio frontends on neural engines is that current vector processors do not deal well with large kernel sizes K. Being primarily designed for image processing, vector processors and related toolchains are tailored to work on kernel sizes of 11×11 at most, resulting in a maximum of K=121. When working with larger kernels is allowed, large model conversion losses can be experienced, resulting in significant discrepancies between the output produced on a regular CPU vs a vector processor for the same input signal.

Therefore, according to various embodiments herein, an audio processing system is disclosed having a multi-rate learnable audio front end subject to kernel size constraint. The system overcomes the limitations described above, and allows for audio frontends to be correctly executed on a variety of vector processes. The system also preserves the representation power of classical filterbanks while reducing conversion errors.

Embodiments of the present disclosure apply CNNs for processing of audio signals for spectrogram representation. In these embodiments, audio signals are transformed into spectrograms, which are two-dimensional matrix representations that show how the frequency content of the audio changes over time. Each spectrogram can essentially be a visual (image) representation of the sound, where the x-axis represents time, the y-axis represents frequency, and the color/intensity represents the magnitude of the frequency component. The CNNs can then be applied to these spectrogram images.

The core of CNNs lies in their convolutional layers. In the context of audio, these layers slide small filters (kernels) over the spectrogram, detecting different patterns at various scales. Low-level filters might detect simple features like edges or corners, while higher-level filters can capture more complex patterns like textures or motifs.

There are many different ways to build a spectrogram, which can lead to different results. A standard way is fixed, in which the manner of transforming 1D raw audio input into a 2D matrix is set and fixed. Another way of transformation is a "learned" transformation in which the system learns on the data it processes. Here, the system learns the filters or kernels that should be used to transform the 1D audio input into the 2D matrix or spectrogram. Every line of the 2D representation represents a response to a filter being used.

FIG. 1 shows an example audio processing system 100 according to an embodiment of the present disclosure. The audio processing system 100 is an example of a system implemented as computer programs on one or more computers in one or more locations, in which the systems, components, and techniques described below can be implemented.

The audio processing system 100 obtains an audio waveform 102 (also represented as $y^{(0)}$ as input. The audio waveform 102 can be a sequence of audio samples (e.g., amplitude values) at a first frequency ("sampling frequency"). The audio processing system 100 processes the audio waveform 102 using a learnable or learned audio frontend model 110 to generate a feature representation 112 of the audio waveform, such as a 2D matrix or spectrogram.

In embodiments, the audio frontend model 110 is a machine learning model that is configured to apply a learned filtering operation that has a plurality of filtering parameters, a learned pooling operation that has a plurality of pooling parameters, and a learned normalization operation that has a plurality of normalization parameters to generate the feature representation 112 of the audio waveform 102. The operations performed by the audio frontend model 110 to generate the feature representation 112 are described in more detail below with reference to FIGS. 2-4. The system 100 processes the feature representation 112 using an audio understanding machine learning model 120. The audio understanding machine learning model 120 is a machine learning model that has parameters ("audio understanding parameters") that are configured to process the feature representation 112 to generate a respective output 122 for each of one or more audio understanding tasks, e.g., for one or more of the tasks described above or for a different task that requires making a prediction about the content of the audio waveform 102.

The audio understanding model 120 can be any appropriate model, e.g., one that was previously configured to receive a mel-filterbank representation of an audio signal as input. That is, as a particular example, the audio frontend model 110 can replace, in an audio processing pipeline, a system that maps an audio waveform into a mel-filterbank representation of the audio waveform that is provided as input to the audio understanding model 120.

Particular examples of audio understanding models that can receive as input the feature representation 112 include convolutional neural networks, e.g., those having an EfficientNet architecture, fully-connected neural networks, e.g., a multi-task neural network that has a respective set of linear layers for each of the multiple tasks, recurrent neural networks, e.g., long-short term memory (LSTM) or gated recurrent unit (GRU) based neural networks, or self-attention neural networks, e.g., Transformer neural networks.

The audio frontend model 110 is referred to as a "learned" or "learnable" audio frontend model because the values of the parameters of the learned audio frontend model, i.e., the values of the filtering, pooling, and normalization parameters, are (or can be) learned end-to-end with the audio understanding model 120. In other words, the operations performed by the audio frontend model 110 are entirely differentiable, allowing the audio frontend model 110 to be trained jointly with a "backend" model through gradient descent. This is unlike other prominent representations, e.g., mel-filterbank representations, that are hard-coded and are therefore not able to be fine-tuned to improve the performance of a given model 120 on a given set of one or more audio processing tasks.

In particular, the system 100 includes a training engine 150 that trains the audio frontend model 110 and the audio understanding model 120 on respective training data for each of the one or more audio understanding tasks. The training data for a given task includes a set of training audio inputs and, for each audio input, a target output for the given task that should be generated by the audio understanding model 120 by processing a feature representation for the training audio input that is generated by the audio frontend model 110. In embodiments, the training engine 150 trains the models 110 and 120 on the training data for a given task through gradient descent and, in particular, trains the audio frontend model 110 by backpropagating gradients of a loss function for the given task through the audio understanding model 120 and into the audio frontend model 110. The loss function can be any appropriate loss function for the task that measures the performance of the by the audio understanding model 120 on the given task given the target outputs in the training data for the given task, e.g., a classification loss if the audio understanding task is a classification task or a regression loss if the audio understanding task is a regression task.

In some cases, the training engine 150 can pre-train the audio frontend model 110 on one or more tasks jointly with an original backend model and then train the audio frontend model 110 with a new backend model on a different task, e.g., while keeping the pre-trained values of the parameters of the model 110 fixed and updating the parameters of the new backend model or updating the parameters of the new backend model while also fine-tuning the pre-trained values of the parameters of the model 110. For example, this can be done in cases where there is a large amount of training data available for the one or more tasks that the original backend model performs while only a limited amount of training data is available for the task(s) that the new backend model performs.

Figure 2:
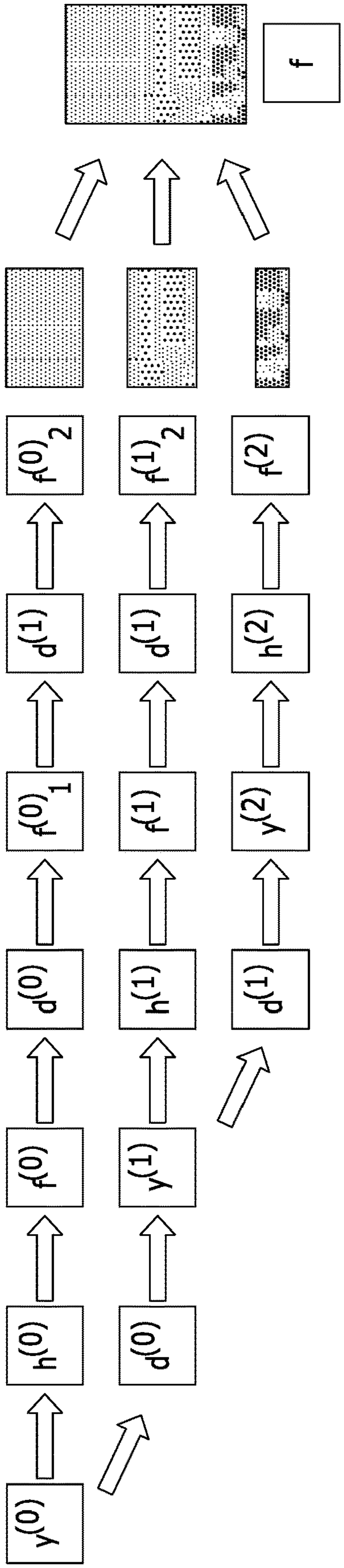
FIG. 2 illustrates a schematic example of an architecture of the learnable audio frontend, according to an embodiment.

FIG. 2 illustrates an example of an architecture of the learnable audio frontend 110, according to an embodiment. As illustrated, the learnable audio frontend model 110 is a multi-stage learnable audio frontend model. With the illustrated multi-stage approach, the frontend model receives as input the raw audio input $y^{(0)}$, which can originate from a microphone, and applies a small set of filters, including a first filterbank $h^{(0)}$ and a first decimation layer or filter $d^{(0)}$. The first filterbank $h^{(0)}$ applied to the raw audio input yields a first time-frequency representation $f^{(0)}$. The first decimation filter $d^{(0)}$ yields a first decimated raw audio input $y^{(1)}$ which can be used for a subsequent processing stage, hence a multi-stage approach. In particular, the multi-stage learnable audio frontend model 110 can apply another small set of filters, including a second filterbank $h^{(1)}$ and a second decimation filter $d^{(1)}$. The second filterbank $h^{(1)}$ yields a second time-frequency representation $f^{(1)}$, and the second decimation filter $d^{(1)}$ yields a second decimated raw audio input $y^{(2)}$. The second decimated raw audio input $y^{(2)}$ can be subjected to a third filterbank $h^{(2)}$ in order to yield a third time-frequency representation $f^{(2)}$.

The first and second time-frequency representations $f^{(0)}$ and $f^{(1)}$ have a higher temporal resolution than the third time-frequency representation $f^{(2)}$, therefore they are decimated along the time axis by the decimation filters $d^{(0)}$ and $d^{(1)}$ to obtain three temporally-coherent representations $f^{(0)_2}$, $f^{(1)_2}$, and $f^{(2)}$. These three temporally-coherent representations are stacked together in the output time-frequency matrix or spectrogram f.

In short, the raw audio input $y^{(l)}$ at stage l is fed to a filterbank $h^{(l)}$ to obtain a time-frequency representation $f^{(l)}$, and to a decimation filter $d^{(l)}$ to get $y^{(l+1)}$, the decimated raw audio input for stage l+1.

The filterbanks $h^{(l)}$ and the decimation filters $d^{(l)}$ are learnable, constrained to a fixed functional form.

Figure 3A:
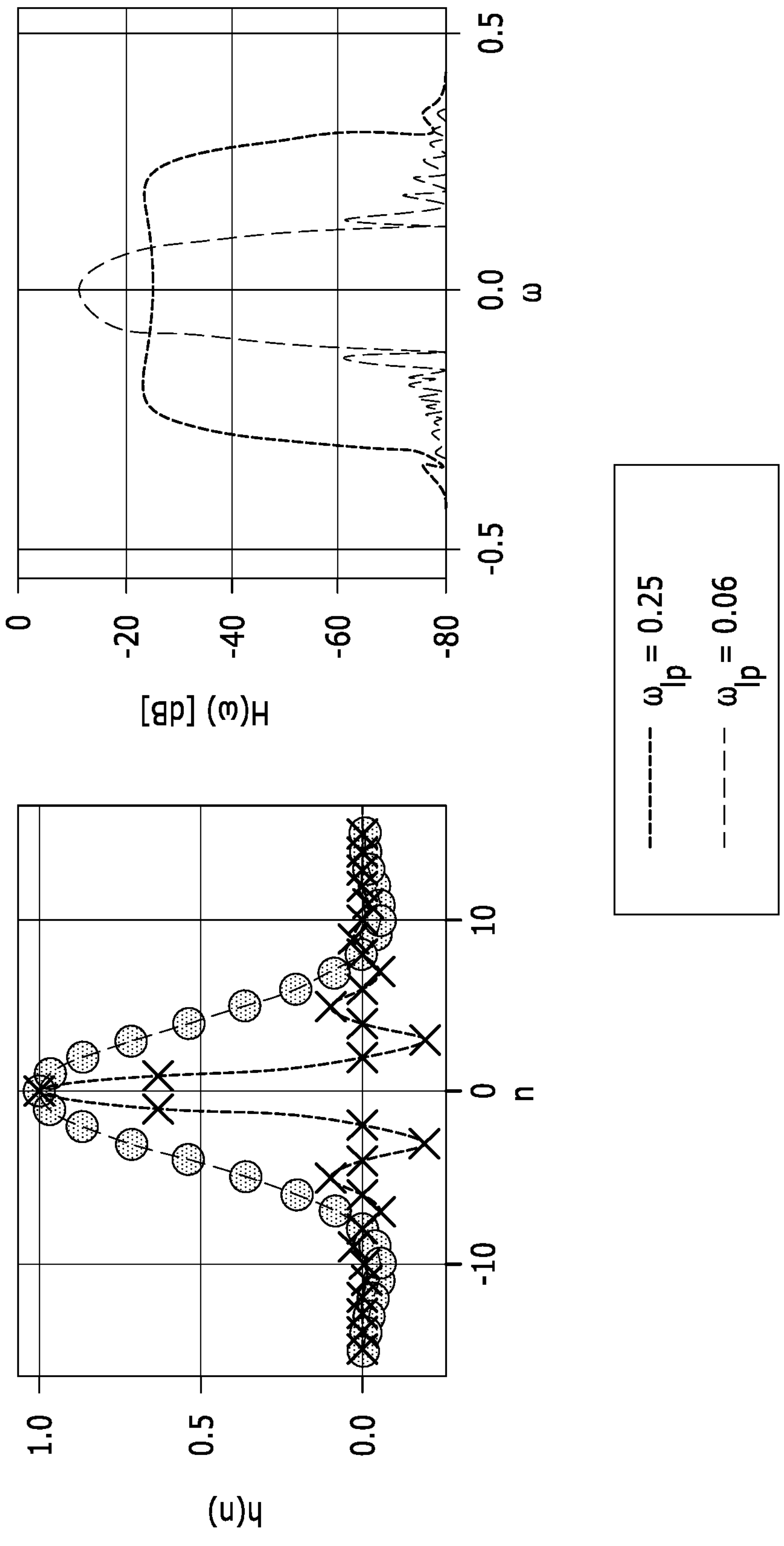
FIG. 3A illustrates an impulse response (left) and frequency response magnitude (right) of sinc low-pass filters with different low-pass frequencies, according to an embodiment.

In an embodiment, K represents the maximum filter length, as constrained by the hardware accelerator of choice, and $$n \in \left[-\frac{K-1}{2}, \frac{K-1}{2}\right]$$

represents the sample index of a discrete filter with K coefficients. The decimation filter $d^{(l)}$ is a truncated sinc as defined in Equation (1) below, a learnable low-pass filter with an almost flat frequency response below the desired bandwidth $\omega_{lp} \in [0, 0.5]$. Given a desired decimation rate r, from the Nyquist theorem follows $\omega_{lp} < 1/(2r)$. Two simple sinc filters are depicted in FIG. 3A.

$$h[n] = \frac{\sin(2\pi\omega n)}{2\pi\omega n} \tag{1}$$

In embodiments, a bank of Gabor filters are used for $h^{(l)}$ so that each filter is fully described by only two learnable parameters, i.e., the center frequency and the bandwidth. The impulse response of a Gabor filter centered at normalized frequency $\omega \in [0, 0.5]$ with standard deviation $\sigma$ is defined in Equation (2) below, where j denotes the imaginary unit.

$$h[n] = \frac{K\sigma}{\sqrt{2\pi}} e^{-\frac{1}{2}(\sigma n)^2} e^{2j\pi\omega n} \tag{2}$$

The corresponding magnitude in the frequency domain is defined in Equation (3) below, where $k \in [-0.5, 0.5]$ is the normalized frequency.

$$|H[k]| = e^{-\frac{1}{2}\left(\frac{2\pi(k-\omega)}{\sigma}\right)^2} \tag{3}$$

Figure 3B:
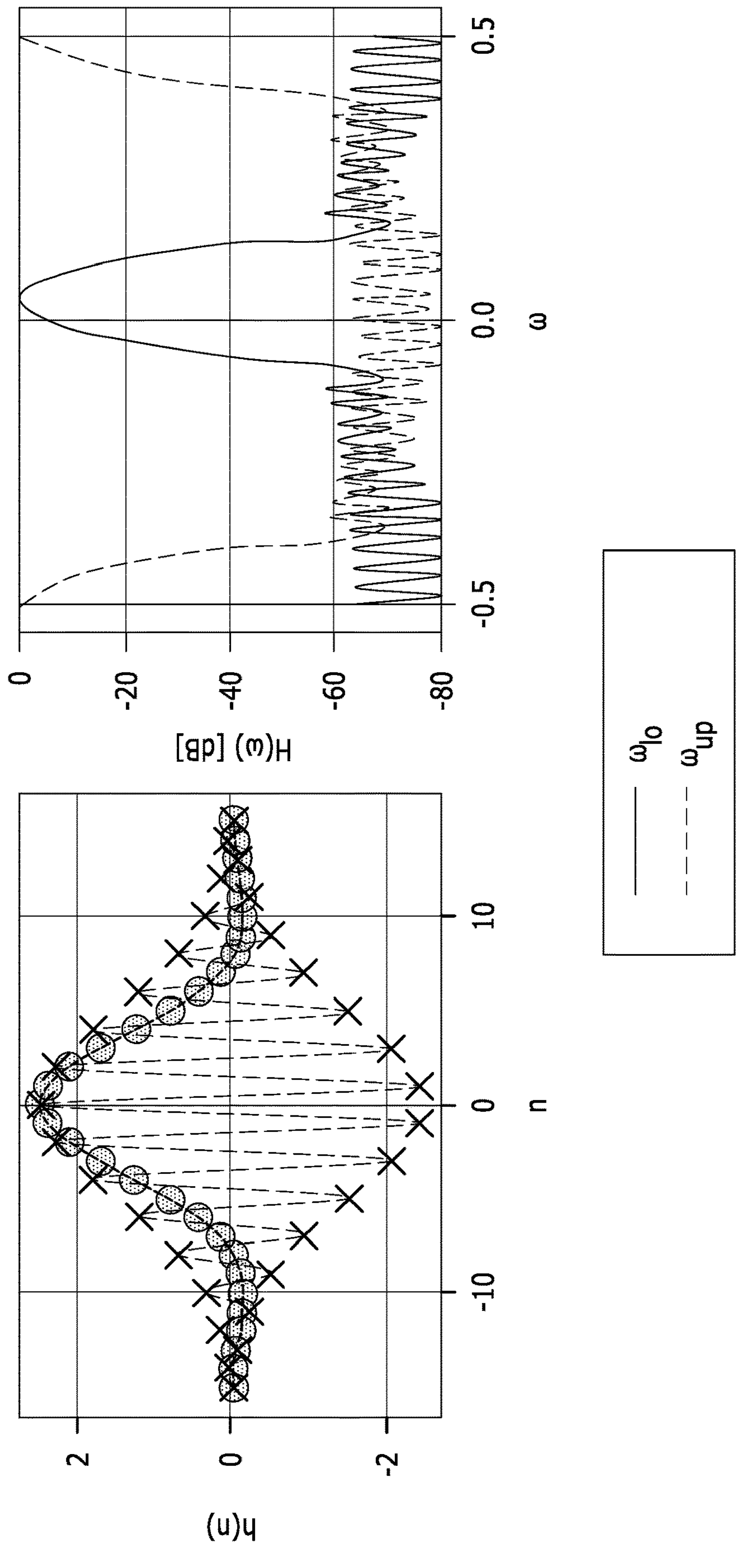
FIG. 3B illustrates a real component of the impulse response (left) and frequency response magnitude (right) of Gabor filters, according to an embodiment.

Given K two constraints can be derived that will drive the design of the multi-rate filterbank: how much proficiencies the system can tolerate, and how much noise can be allowed in the filters. Regarding the former, the range of frequencies, excluding $\omega=0$, that can be represented by a filter length of K is constrained between 1/K and 0.5 (Nyquist). FIG. 3B shows the impulse and frequency response of two Gabor filters designed with K=31 for the lower and upper bound frequencies, $\omega_{lo}=1/K$ and $\omega_{up}=0.5$, respectively.

Figure 3C:
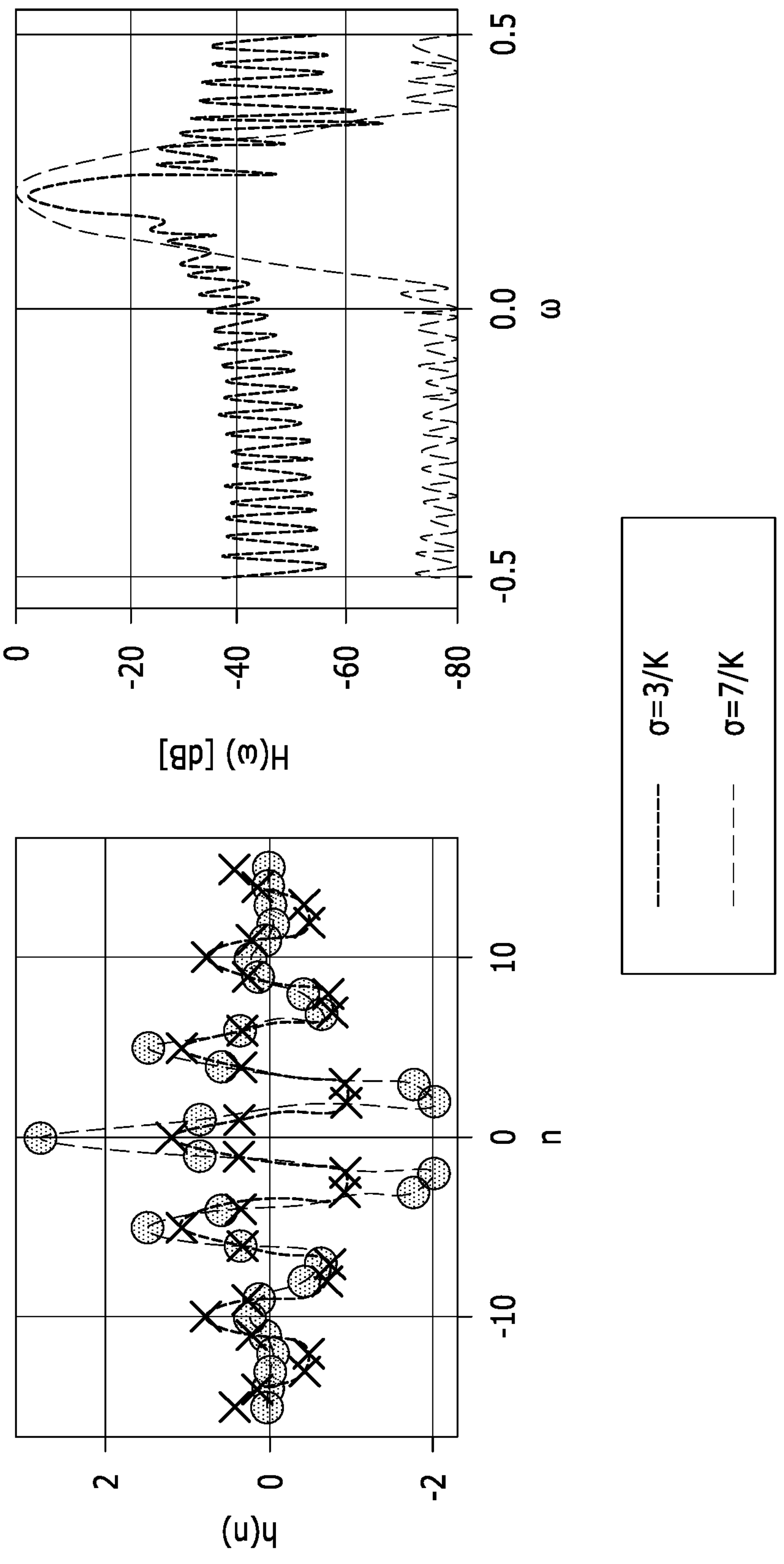
FIG. 3C illustrates a real component of the impulse response (left) and frequency response magnitude (right) of Gabor filters, according to another embodiment.

Regarding the second constraint, namely on $\sigma$, which is necessary to control the maximum amount of tolerable ripple, i.e., the magnitude of side-lobes in the frequency domain. A filter with a small bandwidth results in a truncated impulse response due to the limited length of the filter, thus leading to stronger side-lobes. The lower bound for $\sigma$ expressed in normalized frequency is defined as $\sigma_{min}$. He specific value depends on the application, and in an embodiment $$\frac{3}{K} < \sigma_{min} < \frac{5}{K}$$

provides a good trade-off between side-lobes attenuation and filterbank depth. FIG. 3C shows how the impulse and frequency responses change for varying values of $\sigma$.

The prior knowledge on a specific task can suggest that a certain set of center frequencies and associated bandwidth $F=\{(f_i, b_i), i \in [1, M]\}$ will make a good initialization for the filterbank. The Mel scale can be used to determine F and in the following it can be assumed $f_i$ and $b_i$ are expressed in Hz. Given a sampling rate $f_s^{(l)}$ (for stage l, the two aforementioned constraints determine which $(f_i, b_i)$ pairs can be represented at a specific stage.

In practice, the decimation rate $r^{(l)}$ between stages l and l+1 also has an upper bound as defined in Equation (4) below, directly derived by the Nyquist theorem. Defining $F_{in}^{(l)}$ as the sets of frequencies and bandwidths yet to be allocated at the beginning of stage l, the value of $r^{(l)}$ is then selected as the integer number, subject to Equation (4), that maximizes the number of frequency-bandwidth pairs $(f_i, b_i)$ that can be represented at stage l+1.

$$r^{(l)} < \frac{f_s^{(l)}}{2\max\{f_i \in \mathcal{F}_{in}^{(l+1)}\}} \tag{4}$$

Assuming a native sample rate $f_s^{(0)}$, also expressed in Hz, as necessary to fulfill the Nyquist criteria on the desired frequencies and the hardware constraints, Algorithm 1 shown in FIG. 4 details how to allocate the desired initialization frequencies and related bandwidths $F^{(j)}$ to the different stages of the multi-rate learnable audio frontend, and how to compute the decimation rate $r^{(j)}$ for each stage. The entry point of the algorithm is GETMULTISTAGEFB, that given the filter length K, the set of initialization frequencies and bandwidths F, the native sampling rate $f_s^{(0)}$, and the minimum filter bandwidth $\sigma_{min}$, builds the L stages of the filterbank and returns the set of frequency-bandwidth pairs $(F^{(j)})$ and the decimation factor $r^{(j)}$ for each stage. The auxiliary function GETSTAGEIDXS determines the indices (I) of the provided frequency-bandwidth pairs $(F_{in})$ that can be represented given sampling frequency at the specific stage $(f_s)$ and the minimum bandwidth $(\sigma_{min})$. GETDECIMATIONRATE computes the decimation rate (r) that allows for most frequencies to be represented in the following stage.

Disclosed herein is a novel multi-rate learnable frontend model for audio-based neural networks. The proposed frontend builds on top of other learnable frontends to leverage the benefits of learnable filterbanks in audio applications, while taking into account the practical limitations of embedded development of audio DNNs. The experimental evaluation shows how the performance of a multi-rate frontend is on par with a constraint-free learnable frontend, while still outperforming classical fixed frontends.

Figure 5:
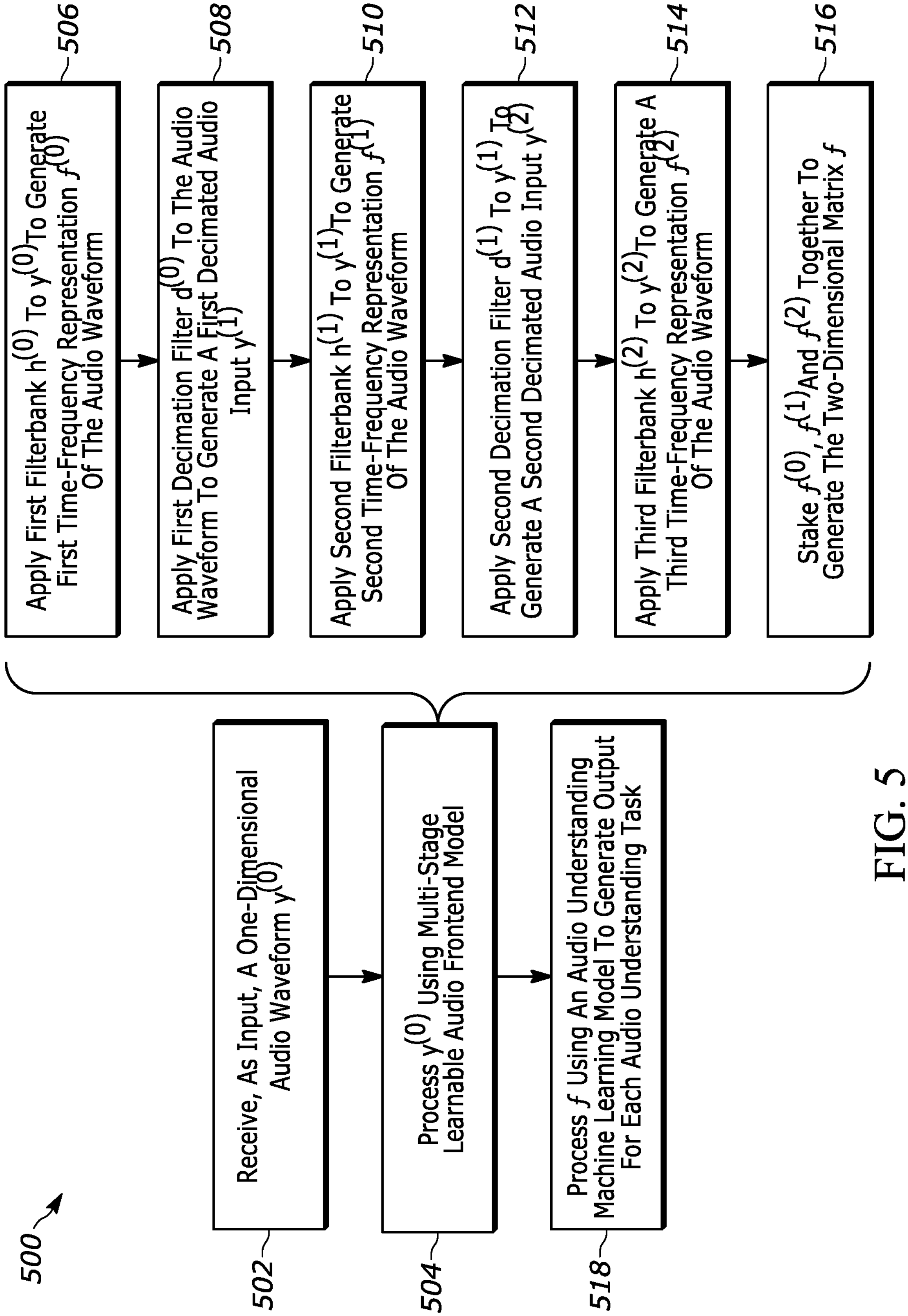
FIG. 5 illustrates a flow chart of a method of processing audio data with a multi-stage learnable audio frontend model, according to an embodiment.

The present disclosure provides a type of learnable frontend audio processing system. Learnable filter banks are implemented. This could be difficult to implement (and likely why it has not been done before) because they require a large number of coefficients that cannot be used in embedded applications. So, the present disclosure proposes a multi-stage approach. FIG. 5 illustrates a method 500 of processing audio data with a multi-stage learnable audio frontend model such as disclosed above. The method can be carried out by one or more of the processors and/or computing systems disclosed herein. The method can be implemented by the audio processing system 100 and its multi-stage learnable audio frontend model 110, for example.

At 502, the audio processing system 100 receives, as input, a one-dimensional audio waveform $y^{(0)}$. This can be raw audio input, such as generated by a microphone for example. The audio input may of a specific event, and for a specific period of time, such as within a range of 10-20 seconds. At 504, the audio processing system 100 processes the one-dimensional audio waveform $y^{(0)}$ using a multi-stage learnable audio frontend model, e.g., model 110, to convert the one-dimensional audio waveform into a two-dimensional matrix or spectrogram representing features of the audio waveform. Here, the multi-stage learnable audio frontend model is configured to perform the following steps 506-516.

At 506, the model 110 applies a first filterbank $h^{(0)}$ to the audio waveform to generate a first time-frequency representation $f^{(0)}$ of the audio waveform. At 508, the model 110 applies a first decimation filter $d^{(0)}$ to the audio waveform to generate a first decimated audio input $y^{(1)}$. At 510, the model 110 applies a second filterbank $h^{(1)}$ to the first decimated audio input $y^{(1)}$ to generate a second time-frequency representation $f^{(1)}$ of the audio waveform. At 512, the model 110 applies a second decimation filter $d^{(1)}$ to the first decimated audio input $y^{(1)}$ to generate a second decimated audio input $y^{(2)}$. At 514, the model 110 applies a third filterbank $h^{(2)}$ to the second decimated audio input $y^{(2)}$ to generate a third time-frequency representation $f^{(2)}$ of the audio waveform. At 516, the model stacks the first time-frequency representation $f^{(0)}$, the second time-frequency representation $f^{(1)}$, and the third time-frequency representation $f^{(2)}$ together to generate the two-dimensional matrix f.

At 518, the audio processing system 100 processes the two-dimensional matrix using an audio understanding machine learning model 120 having a plurality of audio understanding parameters to generate a respective output for each of one or more audio understanding tasks.

It should be understood that the steps shown in FIG. 5 are merely exemplary, and in practice more or less iterations of fitlerbanks and decimation filters can be implemented. For example, in one embodiment, only two stages of filterbanks and decimation filters are implemented. In other words, steps 512 and 514 can be omitted and instead only two time-frequency representations are stacked at step 516. Of course, in other embodiments more filterbanks and decimation filters are used than illustrated in FIG. 5.

According to embodiments, the filters or kernels disclosed herein can be implemented on (i.e., tuned to or look to) specific pieces of the audio. For example, $h^{(0)}$ can be applied to high-frequency sounds (e.g., sound above an upper threshold in Hz), $h^{(1)}$ can be applied to mid-frequency sound (e.g., sound below the upper threshold, but above a lower threshold), and $h^{(2)}$ can be applied to low-frequency sound (e.g., sound below the lower threshold). Since we want the same number of samples when stacked, this is why the decimation filters $d^{(0)}$ and $d^{(1)}$ are used—to shift the sound so each part of the final spectrogram has the same number of samples.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, .e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method of processing audio data with a multi-stage learnable audio frontend model, the method comprising:

receiving, as input, a one-dimensional audio waveform $y^{(0)}$;

processing the audio waveform $y^{(0)}$ using a multi-stage learnable audio frontend model to convert the one-dimensional audio waveform into a two-dimensional matrix representing features of the audio waveform, wherein the multi-stage learnable audio frontend model is configured to:

apply a first filterbank $h^{(0)}$ to the audio waveform to generate a first time-frequency representation $f^{(0)}$ of the audio waveform;

apply a first decimation filter $d^{(0)}$ to the audio waveform to generate a first decimated audio input $y^{(1)}$;

apply a second filterbank $h^{(1)}$ to the first decimated audio input $y^{(1)}$ to generate a second time-frequency representation $f^{(1)}$ of the audio waveform; and stack the first time-frequency representation $f^{(0)}$ and the second time-frequency representation $f^{(1)}$ together to generate the two-dimensional matrix f; and processing the two-dimensional matrix using an audio understanding machine learning model having a plurality of audio understanding parameters to generate a respective output for each of one or more audio understanding tasks.

2. The method of claim 1, wherein the multi-stage learnable audio frontend model is further configured to:

apply a second decimation filter $d^{(1)}$ to the first decimated audio input $y^{(1)}$ to generate a second decimated audio input $y^{(2)}$;

apply a third filterbank $h^{(2)}$ to the second decimated audio input $y^{(2)}$ to generate a third time-frequency representation $f^{(2)}$ of the audio waveform.

3. The method of claim 2, wherein the multi-stage learnable audio frontend model is further configured to stack the third time-frequency representation $f^{(2)}$ with the first time-frequency representation $f^{(0)}$ and the second time-frequency representation $f^{(1)}$ to generate the two-dimensional matrix f.

4. The method of claim 3, wherein the third time-frequency representation has a temporal resolution, the method further comprising:

decimating the first time-frequency representation and the second time-frequency representation to match the temporal resolution of the third time-frequency representation.

5. The method of claim 1, wherein the first time-frequency representation has a first temporal resolution, and the second time-frequency representation has a second temporal resolution, the method further comprising:

decimating the first time-frequency representation and the second time-frequency representation such that the first temporal resolution matches the second temporal resolution.

6. The method of claim 1, further comprising:

determining the first and second filterbanks based on a set of initial frequencies of interest, a maximum tolerated ripple on a frequency response of the first and second filterbanks, and an original sampling rate of the one-dimensional audio waveform.

7. The method of claim 1, wherein the one-dimensional audio waveform is generated from a microphone.

8. The method of claim 1, wherein the first filterbank is applied to a portion of the one-dimensional audio waveform that has a frequency above a threshold, and the second filterbank is applied to a portion of the first decimated audio input $y^{(1)}$ that has a frequency below the threshold.

9. An audio processing system comprising:

a processor; and memory having instructions that, when executed by the processor, cause the processor to receive a one-dimensional audio waveform;

process the one-dimensional waveform via a multi-stage learnable audio frontend model to convert the one-dimensional audio waveform into a two-dimensional matrix representing features of the audio waveform, wherein the multi-stage learnable audio frontend model is configured to:

apply a first filterbank $h^{(0)}$ to the audio waveform to generate a first time-frequency representation $f^{(0)}$ of the audio waveform;

apply a first decimation filter $d^{(0)}$ to the audio waveform to generate a first decimated audio input $y^{(1)}$;

apply a second filterbank $h^{(1)}$ to the first decimated audio input $y^{(1)}$ to generate a second time-frequency representation $f^{(1)}$ of the audio waveform; and stack the first time-frequency representation $f^{(0)}$ and the second time-frequency representation $f^{(1)}$ together to generate the two-dimensional matrix f; and process the two-dimensional matrix using an audio understanding machine learning model having a plurality of audio understanding parameters to generate a respective output for each of one or more audio understanding tasks.

10. The system of claim 9, wherein the multi-stage learnable audio frontend model is further configured to:

apply a second decimation filter $d^{(1)}$ to the first decimated audio input $y^{(1)}$ to generate a second decimated audio input $y^{(2)}$;

apply a third filterbank $h^{(2)}$ to the second decimated audio input $y^{(2)}$ to generate a third time-frequency representation $f^{(2)}$ of the audio waveform.

11. The system of claim 10, wherein the multi-stage learnable audio frontend model is further configured to stack the third time-frequency representation $f^{(2)}$ with the first time-frequency representation $f^{(0)}$ and the second time-frequency representation $f^{(1)}$ to generate the two-dimensional matrix f.

12. The system of claim 11, wherein the third time-frequency representation has a temporal resolution, and wherein the instructions also cause the processor to:

decimate the first time-frequency representation and the second time-frequency representation to match the temporal resolution of the third time-frequency representation.

13. The system of claim 9, wherein the first time-frequency representation has a first temporal resolution, and the second time-frequency representation has a second temporal resolution, and wherein the instructions also cause the processor to:

decimate the first time-frequency representation and the second time-frequency representation such that the first temporal resolution matches the second temporal resolution.

14. The system of claim 9, wherein the instructions further cause the processor to:

determine the first and second filterbanks based on a set of initial frequencies of interest, a maximum tolerated ripple on a frequency response of the first and second filterbanks, and an original sampling rate of the one-dimensional audio waveform.

15. The system of claim 9, wherein the one-dimensional audio waveform is generated from a microphone.

16. The system of claim 9, wherein the first filterbank is applied to a portion of the one-dimensional audio waveform that has a frequency above a threshold, and the second filterbank is applied to a portion of the first decimated audio input $y^{(1)}$ that has a frequency below the threshold.

17. A method of processing audio data with a multi-stage learnable audio frontend model, the method comprising:

receiving, as input, a one-dimensional audio waveform $y^{(0)}$;

processing the audio waveform $y^{(0)}$ using a multi-stage learnable audio frontend model to convert the one-dimensional audio waveform into a two-dimensional matrix representing features of the audio waveform, wherein the multi-stage learnable audio frontend model is configured to:

apply a first filterbank $h^{(0)}$ to the audio waveform to generate a first time-frequency representation $f^{(0)}$ of the audio waveform;

apply a first decimation filter $d^{(0)}$ to the audio waveform to generate a first decimated audio input $y^{(1)}$;

apply a second filterbank $h^{(1)}$ to the first decimated audio input $y^{(1)}$ to generate a second time-frequency representation $f^{(1)}$ of the audio waveform;

apply a second decimation filter $d^{(1)}$ to the first decimated audio input $y^{(1)}$ to generate a second decimated audio input $y^{(2)}$;

apply a third filterbank $h^{(2)}$ to the second decimated audio input $y^{(2)}$ to generate a third time-frequency representation $f^{(2)}$ of the audio waveform; and stack the first time-frequency representation $f^{(0)}$, the second time-frequency representation $f^{(1)}$, and the third time-frequency representation $f^{(2)}$ together to generate the two-dimensional matrix f; and processing the two-dimensional matrix using an audio understanding machine learning model having a plurality of audio understanding parameters to generate a respective output for each of one or more audio understanding tasks.

18. The method of claim 17, further comprising:

determining the first and second filterbanks based on a set of initial frequencies of interest, a maximum tolerated ripple on a frequency response of the first and second filterbanks, and an original sampling rate of the one-dimensional audio waveform.

19. The method of claim 17, wherein the first filterbank is applied to a portion of the one-dimensional audio waveform that has a frequency above an upper threshold, and the second filterbank is applied to a portion of the first decimated audio input $y^{(1)}$ that has a frequency below the upper threshold.

20. The method of claim 17, wherein the third filterbank is applied to a portion of the one-dimensional audio waveform that has a frequency below a lower threshold.

* * * * *